US010535041B2

(12) United States Patent
Maarek et al.

(10) Patent No.: US 10,535,041 B2
(45) Date of Patent: Jan. 14, 2020

(54) SYSTEM AND METHOD OF PREDICTING COMMUNITY MEMBER RESPONSIVENESS

(75) Inventors: Yoelle Maarek, Haifa (IL); Gideon Dror, Tel Aviv (IL); Idan Szpektor, Kfar Saba (IL); Dan Pelleg, Haifa (IL)

(73) Assignee: OATH INC., New York, NY (US)

(*) Notice: Subject to any disclaimer, the term of this patent is extended or adjusted under 35 U.S.C. 154(b) by 374 days.

(21) Appl. No.: 13/533,020

(22) Filed: Jun. 26, 2012

(65) Prior Publication Data
US 2013/0346496 A1 Dec. 26, 2013

(51) Int. Cl.
*G06F 15/16* (2006.01)
*G06Q 10/10* (2012.01)

(52) U.S. Cl.
CPC .................... *G06Q 10/10* (2013.01)

(58) Field of Classification Search
CPC ..... H04N 21/4788; G06Q 50/01; G06Q 10/10
USPC ......................................................... 709/204
See application file for complete search history.

(56) References Cited

U.S. PATENT DOCUMENTS

| | | | |
|---|---|---|---|
| 7,856,350 B2* | 12/2010 | Zhou et al. ........................ 704/9 |
| 7,921,369 B2* | 4/2011 | Bill ................... G06F 17/30749 709/206 |
| 8,078,978 B2* | 12/2011 | Perry ...................... G06F 17/24 704/10 |
| 8,566,262 B2* | 10/2013 | Deyo ............................. 706/12 |
| 8,572,129 B1* | 10/2013 | Lee ....................... G06Q 50/01 707/798 |
| 8,727,885 B2* | 5/2014 | Berger .................... A63F 13/80 273/243 |
| 8,924,326 B2* | 12/2014 | Arquette ................. H04L 51/32 706/45 |
| 9,122,759 B2* | 9/2015 | Carter ............... G06F 17/30861 |
| 2006/0080161 A1* | 4/2006 | Arnett ...................... G06F 21/31 705/7.31 |
| 2007/0078675 A1* | 4/2007 | Kaplan .................. G06Q 10/10 705/26.1 |
| 2008/0046317 A1* | 2/2008 | Christianson et al. .......... 705/14 |
| 2008/0126303 A1* | 5/2008 | Park .................. G06F 17/30817 |
| 2009/0170608 A1* | 7/2009 | Herrmann et al. ............. 463/42 |
| 2010/0082751 A1* | 4/2010 | Meijer et al. .................. 709/206 |
| 2010/0162135 A1* | 6/2010 | Wanas .................... G06Q 10/10 715/753 |
| 2010/0205168 A1* | 8/2010 | Yang ................. G06F 17/30864 707/709 |

(Continued)

*Primary Examiner* — Kevin T Bates
*Assistant Examiner* — Clarence D McCray
(74) *Attorney, Agent, or Firm* — James J. DeCarlo; Greenberg Traurig, LLP

(57) ABSTRACT

Disclosed herein is a mechanism, which may be in a community-driven system, to assist a user, or member of the community, to articulate a request, such as a question, that is likely to receive a response, e.g., an answer to a question posed, from the user community. A machine learning approach may be used to generate a model, which model may be trained using previously-posted requests, e.g., questions, and response, e.g., answers. The generated model may be used to make a prediction, e.g., to predict a potential number of answers for a given question, which prediction may also have an accompanying confidence score. A prediction generated by the model may be presented to the user as the user is providing the input, e.g., typing a question. Such prediction may be generated for a partial question, e.g., as the question is being typed, as well as a completed question.

22 Claims, 10 Drawing Sheets

(56) References Cited

U.S. PATENT DOCUMENTS

| | | | | |
|---|---|---|---|---|
| 2010/0211533 A1* | 8/2010 | Yang | G06N 99/005 | |
| | | | 706/12 | |
| 2010/0223341 A1* | 9/2010 | Manolescu | G06F 17/30905 | |
| | | | 709/206 | |
| 2010/0257186 A1* | 10/2010 | Dewar | G06Q 10/107 | |
| | | | 707/749 | |
| 2011/0231245 A1* | 9/2011 | Bhatia et al. | 705/14.43 | |
| 2011/0231246 A1* | 9/2011 | Bhatia et al. | 705/14.43 | |
| 2011/0282947 A1* | 11/2011 | Dodson | 709/206 | |
| 2011/0282965 A1* | 11/2011 | Dodson | 709/217 | |
| 2012/0047025 A1* | 2/2012 | Strohman | G06F 17/3064 | |
| | | | 705/14.71 | |
| 2012/0122588 A1* | 5/2012 | Berger et al. | 463/42 | |
| 2012/0158630 A1* | 6/2012 | Zaman | G06Q 30/02 | |
| | | | 706/21 | |
| 2012/0174145 A1* | 7/2012 | Frazier et al. | 725/14 | |
| 2012/0209986 A1* | 8/2012 | Shah et al. | 709/224 | |
| 2012/0246230 A1* | 9/2012 | Ferbar | G06Q 50/01 | |
| | | | 709/204 | |
| 2012/0246580 A1* | 9/2012 | Bouverat | 715/753 | |
| 2012/0270618 A1* | 10/2012 | Abramoff et al. | 463/9 | |
| 2013/0159219 A1* | 6/2013 | Pantel | G06N 20/00 | |
| | | | 706/12 | |
| 2013/0166319 A1* | 6/2013 | Ackerman et al. | 705/3 | |
| 2013/0203506 A1* | 8/2013 | Brown et al. | 463/42 | |
| 2014/0089048 A1* | 3/2014 | Bruich | 705/7.32 | |
| 2014/0122622 A1* | 5/2014 | Castera et al. | 709/206 | |
| 2014/0207794 A1* | 7/2014 | Du | H04L 51/32 | |
| | | | 707/748 | |
| 2014/0324758 A1* | 10/2014 | Diaz | G06N 5/048 | |
| | | | 706/52 | |
| 2015/0127418 A1* | 5/2015 | Piepgrass | G06Q 30/0201 | |
| | | | 705/7.29 | |
| 2015/0127748 A1* | 5/2015 | Buryak | H04L 51/32 | |
| | | | 709/206 | |

* cited by examiner

* Category information, e.g., category and parent-category in which the request/question is posted
* Time, e.g., hour, day of week, week of the year that the request/question is being input or posted
* List of words appearing in the title. The list of words extracted may be specific to a category of the request/question
* List of words appearing in the body. The list of words extracted may be specific to category of the request/question
* WH questions (where, what, how etc.) of the request/question
* Where there is an associated title, length of title, e.g., in words and/or in characters
* Length of body of the request/question, e.g., length in words and/or in characters
* Where there is a title, does the title have a URL
* Does the body have a URL
* Mean sentiment of the title and the body, if any
* LDA analysis of the text of the request/question, text of the body and title, where there is a title
* Requesting/Asking user's identity
* Number of previous requests/questions made by the requesting/asking user
* Mean number of responses/answers to requesting/asking user's previous requests/questions

FIGURE 3

| family | #feat. | sparsity % | feat.-type |
|---|---|---|---|
| category | 1287 | 0.079 | binary |
| parent-category | 117 | 0.85 | binary |
| hour | 24 | 4.17 | binary |
| day of week | 7 | 14.3 | binary |
| week of year | 51 | 1.96 | binary |
| title category-words | 11286 | 0.011 | numeric |
| body category-words | 23201 | 0.026 | numeric |
| title wh | 11 | 3.50 | binary |
| body wh | 11 | 0.63 | binary |
| title length | 10 | 10 | binary |
| body length | 20 | 5.0 | binary |
| title URL | 1 | 0.046 | binary |
| body URL | 1 | 5.03 | binary |
| sentiment | 4 | 100 | numeric |
| Supervised LDA | 1 | 100 | numeric |
| asker id | 12125 | 0.00092 | binary |
| asker questions | 25 | 4.00 | binary |
| asker mean ans. | 26 | 3.84 | numeric |

FIGURE 7

| Category | Token | $\Delta L(c, t)$ |
|---|---|---|
| Religion & Spirituality | atheist | 892786.1 |
| Books & Authors | twilight | 210805.2 |
| Religion & Spirituality | god | 149612.2 |
| Celebrities | jackson | 141350.8 |
| Celebrities | michael | 140577 |
| Radio | trivia | 127000.4 |
| Other - Pets | family | 115070.3 |
| Other - Beauty & Style | pic | 111222.6 |
| Singles & Dating | sex | 95858.7 |
| Celebrities | mj | 90495.1 |
| Other - Cultures & Groups | black | 89100.2 |
| Religion & Spirituality | christian | 88190.3 |
| Books & Authors | potter | 75482.4 |
| Pregnancy | abortion | 74725 |
| Politics | obama | 64290.2 |

FIGURE 8

| -0.1147 | -0.0351 | 0.0393 | 0.0831 | 0.1328 | 0.2608 |
|---|---|---|---|---|---|
| phone | fix | wear | obama | feel | god |
| card | door | dress | government | woman | jesus |
| buy | break | shoe | care | man | christian |
| mobile | try | jean | health | love | bible |
| samsung | key | shirt | state | guy | believe |
| sim | box | black | people | girl | religion |
| lg | lock | color | law | friend | church |
| blackberry | ring | clothe | president | relationship | say |
| nokium | use | look | say | say | man |
| cell | work | girl | public | think | people |

FIGURE 9

SYSTEM AND METHOD OF PREDICTING COMMUNITY MEMBER RESPONSIVENESS

FIELD OF THE DISCLOSURE

The present disclosure relates to a community-driven system in which a user may request a response from other community members as users of the system, such a request may be in the form of a question to elicit a response from one or more other users in the form of an answer, and more particularly, to predicting a likelihood that a user's request will receive a response from one or more users.

BACKGROUND

A community-driven system typically has a community of users, and any user may ask other users in the community for a response. By way of one example, Yahoo! Answers is a community-driven question and answer system, which allows a user to ask a question and for a user to answer a question posed by a user. To illustrate further, a user may post a question, which is available for review by any user of the system. If a user wishes to do so, a user may submit a response, or answer, to a posted question using the system. The system can be used to view questions as well as answers to the questions.

SUMMARY

It is beneficial in the community-driven system, such as Yahoo answers, to attract as many users to the system. The quality of questions asked and answers provided are factors in attracting and maintaining a community of users. The present disclosure seeks to address this and other considerations and to address failings in the art and provide a system and method of predicting the likelihood of receiving a response to a given request for a response.

By way of a non-limiting example, where a community driven system elicits questions and answers to questions from its community of users, embodiments of the present disclosure predict a likelihood that a question posted by a user from the community is answered by one or more users of the community. To further illustrate, the prediction may be provided to the user that is asking the question so that the user can form a question that is likely to receive a response, or responses, from the user community. While embodiments of the present disclosure are described in connection with a question and answer system, it should be apparent that embodiments of the present disclosure may be used with any community-driven system to predict a likelihood of a community's response to received input, e.g., a request for a response, from a member of the community.

Embodiments of the present disclosure provide a mechanism that may be used in a community-driven application or system to assist a user, or member of the community, to articulate a request, such as a question, that is likely to receive a response, e.g., an answer to a question posed, from the user community. In accordance with one or more such embodiments, a machine learning approach may be used to generate a model using previously-posted questions and answers, which model may be used with a present question to make a prediction, e.g., to predict a potential number of answers for the present question, which prediction may also have an accompanying confidence score. In accordance with one or more embodiments, the prediction generated by the model may be presented to the user as the user is providing the input, e.g., typing a question. Such prediction may be generated for a partial question, e.g., as the question is being typed, as well as a completed question, e.g., once the user has finished entering the question and before or after submitting the question for a response.

The prediction that is provided to the user may be used by the user to determine whether or not to submit, or post, a question for access by the community of users, and/or modify the question to improve the chance of a response to the question. A prediction generated in accordance with one or more embodiments can improve quality of the questions asked as well as the answers provided in response, such that users belonging to a community that uses a community-driven application may be provided with a more interactive and enjoyable experience. Additionally and where a user is informed, in accordance with one or more embodiments of the present disclosure, that the user's question is unlikely to receive a response, the user is less likely to submit the question, and is more likely to pose a modified or different question. This will result in a reduction in unanswered questions, as questions that are received by the community-driven application are more likely to receive a response from the community. Furthermore and where a user elects to submit a question that has a low probability of receiving a response, the user is at least forewarned that such is a likely outcome.

In accordance with one or more embodiments, a method is provided, the method comprising receiving, via at least one computing device, input from a user member of a community of users of a community-driven application, the input comprising at least a portion of a request for response to be directed to the community of users; determining, via the at least one computing device, a plurality of features of the request; determining, via the at least one computing device and using a prediction model, feedback comprising a prediction of a probability of response by the community of users to the request; and providing, via the at least one computing device, the feedback to the user in response to the user's input.

Embodiments of the present disclosure further provide a system comprising at least one computing device comprising one or more processors to execute and memory to store instructions to receive input from a user member of a community of users of a community-driven application, the input comprising at least a portion of a request for response to be directed to the community of users; determine a plurality of features of the request; determine, using a prediction model, feedback comprising a prediction of a probability of response by the community of users to the request; and provide the feedback to the user in response to the user's input.

Embodiments of the present disclosure further provide a computer readable non-transitory storage medium for tangibly storing thereon computer readable instructions that when executed cause at least one processor to receive input from a user member of a community of users of a community-driven application, the input comprising at least a portion of a request for response to be directed to the community of users; determine a plurality of features of the request; determine, using a prediction model, feedback comprising a prediction of a probability of response by the community of users to the request; and provide the feedback to the user in response to the user's input.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a response prediction process flow in accordance with one or more embodiments of the present disclosure.

FIG. 2 provides a general overview of system components for use in accordance with one or more embodiments.

FIG. 3 provides examples of information that may be collected and used to determine features and or attributes used by trainer to train model to make a prediction using the model in accordance with one or more embodiments of the present disclosure.

FIGS. 4, 5 and 6 provide examples of a request and response user interface display in accordance with one or more embodiments of the present disclosure.

FIG. 7 provides a table with examples of feature families that may be extracted from in accordance with one or more embodiments.

FIG. 8 provides examples of category-token pairs in accordance with one or more embodiments of the present disclosure.

FIG. 9 provides examples of topics in accordance with one or more embodiments of the present disclosure.

DETAILED DESCRIPTION

Figure 1:
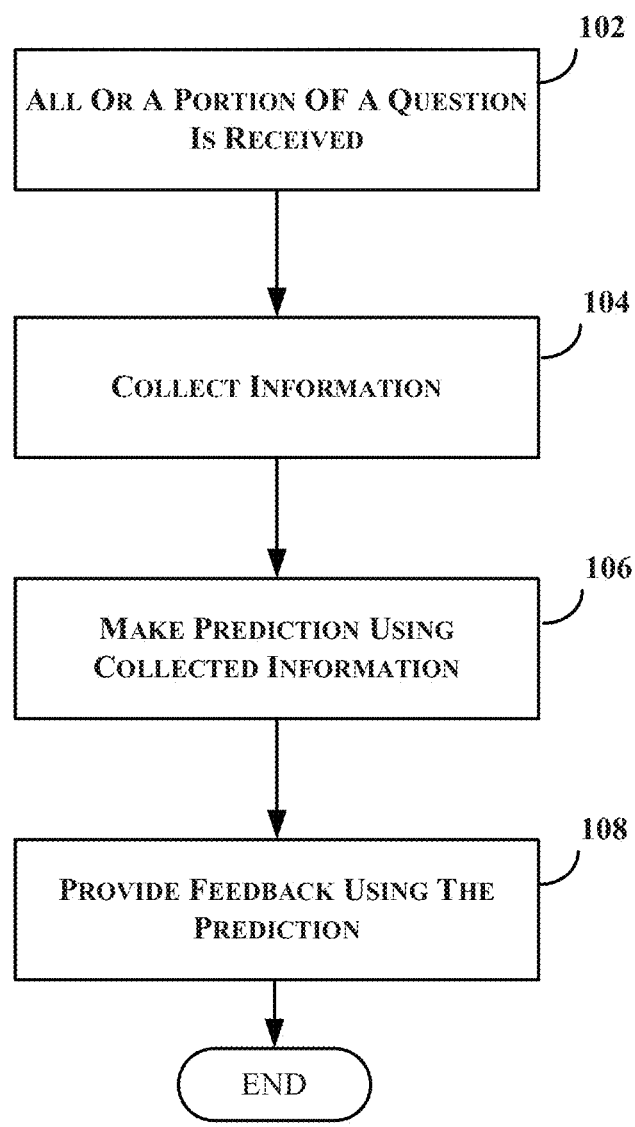

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion.

In general, the present disclosure includes a community responsiveness prediction system, method and architecture. Certain embodiments of the present disclosure will now be discussed with reference to the aforementioned figures, wherein like reference numerals refer to like components.

In accordance with one or more embodiments, one or more features or attributes associated with a user request, e.g., a question, are used to determine a likelihood that one or more user members of a community will respond, e.g., provide an answer, to the request. In accordance with one or more such embodiments, the one or more features or attributes may comprise attributes extracted from or otherwise associated with a question. In accordance with one or more such embodiments, values of the attributes may be provided to a model to determine a likelihood of a response to the user's request.

FIG. 1 provides an example of a response prediction process flow in accordance with one or more embodiments of the present disclosure. The process flow may be implemented by any computing device or system, including without limitation a server computer that may provide a community-driven application or system or may be in communication with a computing system that provides a community-driven application or system, or a client computing device, such as without limitation a client computing device executing Javascript™ in a browser application. At step 102, at least a portion of a question is received from a user. The question may be input via a web browser application executing on the user's computing device, which browser application is in communication with a community-driven frontend, which may comprise a user interface, e.g., one or more web pages that may be provided via a community-driven application or system.

At step 104, information is collected for use in making a prediction. In accordance with one or more embodiments, the information may comprise a number of attributes associated with the question, the user, etc. At step 106, a prediction, which may comprise one or more prediction measures, is generated using the information collected in step 104. In accordance with one or more embodiments, the prediction comprises a measure of a likelihood that the request, e.g., question, will receive a response, e.g., an answer to a question, from one or more user members of a community of the community-driven system. At step 108, feedback is provided to the user that is making the request. In accordance with one or more embodiments, the feedback may be displayed to the user, which feedback may comprise one or more prediction measures of the likelihood that user members of the community will respond to the request for input. By way of a non-limiting example, the feedback may be displayed to the user so that the user is able to determine whether or not to modify or supplement the request, submit the request as is, delete the request and start a new request, etc.

In accordance with one or more embodiments, a supervised learning methodology may be used to predict an expected or estimated number of answers for a given question, or portion of a question. A statistical model may be trained using a set of past questions together with the number of answers received in response to the set of questions, such that the trained model is capable of estimating a probability of receiving an answer for a question, an expected number of answers for the question as well as evaluating the uncertainty in this estimate, e.g., generating a confidence level for an estimate. In accordance with one or more embodiments, a statistical model may be trained in a manner that reflects a temporal order of the questions used as training data, such that a generated model may put more emphasis on recent data, as opposed to older data, in making a prediction. In accordance with one or more embodiments, the attributes or features may be a diverse set, which features may be extracted from question metadata, question content, user data, etc.

As discussed above, feedback, e.g., number of answers, may be immediately provided to the user as the user is providing the input, e.g., as the text of the question is being typed. This allows the user to rephrase the question before actually submitting, or posting, the question to the system for access by the system's community of users, for example.

Figure 2:
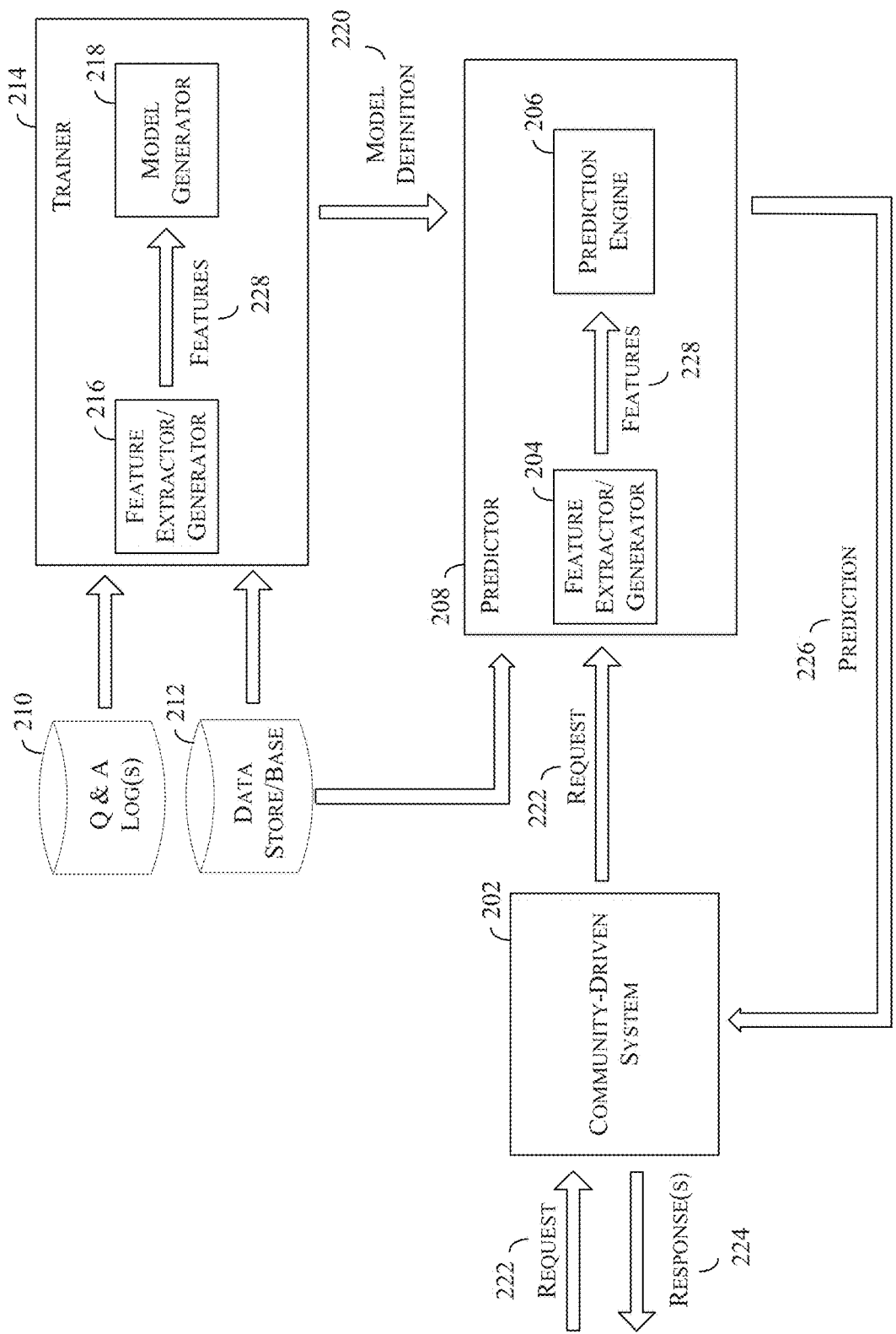

FIG. 2 provides a general overview of system components for use in accordance with one or more embodiments. A trainer 214, which comprises a feature extractor/generator 216 and a model generator 218, may be used to generate a model definition 220. The model definition 220 generated by model generator 218 may be used by prediction engine, or prediction generator, 206 to make a prediction 226, which can be forwarded to system 202. As discussed above, the prediction 226 may comprise one or more measures of the likelihood that a response, or responses, 224 will be provided to a request 222. System 202, which may provide a community-driven application such as a question and answer application, receives request 222 as it is being input by a user. In accordance with one or more embodiments, system 202 may receive the request 222 prior to the user posting the request 222 for publication and access by other users. Thus, system 202 may provide feedback in the form of one or more prediction measures to the user to allow the user an opportunity to determine whether or not to post the request 222, change the request 222 before posting, etc.

By way of a non-limiting example, as system 202 receives input, e.g., some or all of request 222, system 202 may forward the input, request 222, to predictor 208. Predictor 208 comprises feature extractor/generator 204 and prediction engine 206. In accordance with one or more embodiments, feature extractor/generator 204 may be the same as feature extractor/generator 216. In accordance with one or more such embodiments, trainer 214 and predictor 208 can share a feature extractor/generator, or use different instances of the feature extractor/generator.

Feature extractor/generator 204 of predictor 208 collects information, e.g., features or attributes associated with the user input, which may be used by prediction engine 206 to make a prediction. Feature extractor/generator 204 may use information collected to determine features/attributes. It should be apparent that examples of the information collected and features used herein are for illustration purposes only and that embodiments of the present disclosure are not limited with respect to the information collected and/or features/attributes on which a feature extractor/generator operates.

In accordance with one or more embodiments, a client computing device, e.g., a client computing device comprising a browser application and Javascript™ or other executable code may have functionality to perform some or all of the functionality shown in FIG. 1. In accordance with one or more such embodiments, the client computing device may generate prediction 226 using model definition 220, which model definition may be received and stored locally by the client computing device. In accordance with one or more embodiments, the client computing device may retrieve model definition 220, implement predictor 208 to obtain prediction 226, and provide feedback using prediction 226.

FIG. 3 provides examples of information that may be collected and used to determine features and or attributes used by trainer 214 to train model 220 and by predictor 208 to make a prediction using model 220. In accordance with one or more embodiments, feature extractor/generator 216 may collect feature/attribute information from past requests and associated responses, e.g., questions and answers received by system 202 and collected over a period of time, e.g. a number of weeks. Log(s) 210 may store such data, which may in turn be provided to trainer 214. Data store, or database, 212 may comprise information about the user community, e.g., information associated with requesters and responders as members of the community serviced by system 202. In accordance with one or more embodiments, trainer 214 generates model 220 using a number of feature/attribute values determined using data retrieved from log(s) 210 and data store 212.

In the example shown in FIG. 3, information that may be used to determine feature/attribute values include information such as a category information, e.g., a category or hierarchy of categories associated with a request, timing of a request, words used in the body of a request, words used in a title associated with a request, content of a request, such as a location, subject, etc. mentioned in the request, length of a request and/or title of a request, uniform resource locator(s) (URL(s)) used in a request's body and/or title, determined sentiment, which may be determined from the content of a request's body and/or title, user information, such as the requesting user's identity, number of requests and/or response made by a requesting or responding user, number of responses made to a request, an average or mean number of responses provided to the requesting user's previous requests, etc. Category and/or category hierarchy may comprise a topic or subject category or category hierarchy, for example. By way of a further non-limiting example, time of a request may comprise time of day, day of the week, week of the year, year, etc. Content of a request and/or title may be analyzed to answer interrogative inquiries, e.g., to identify person(s), place(s), thing(s), referenced by a request and/or answer. In accordance with one or more embodiments, linear discriminant analysis (LDA) may be used to determine a linear combination of features. Of course it should be apparent that other types of statistical analysis may also be used with one or more embodiments of the present disclosure. Further discussion of these and other features is provided herein.

The features 228 output by the feature extractor/generator, e.g. generator 204 and/or 216, can comprise any of a number, or set, of features, or feature information. Features 228 may be generated from training data retrieved from log(s) 210 and data store 212 and used to build model definition, or model, 220. Features 228 associated with request 222 and output by feature extractor/generator 204 may be used with model 220 to make a prediction of the likelihood that the request 222 will receive one or more responses 224.

In accordance with one or more embodiments, a prediction 226, which comprises one or more measures indicating a likelihood that a request will receive at least one response, is generated by predictor 208 and provided to system 202. System 202 may provide feedback to the requester, or requesting user, which feedback may include any of the one or more measures. The feedback may be used by the requester to determine whether or not to post the request 222, modify the request 222 before posting, abandon the request 222, input a new request 222, etc.

Figure 4:
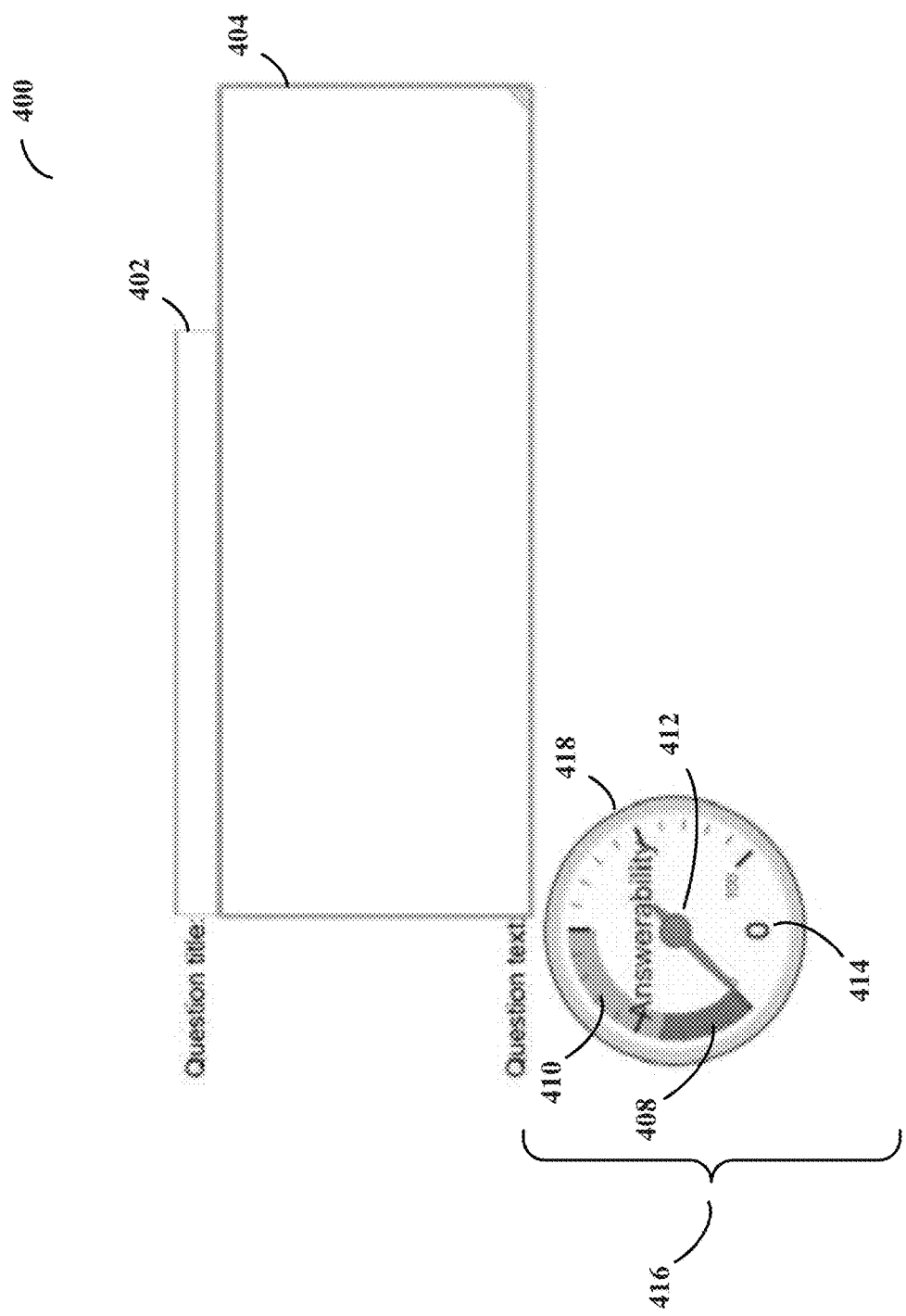
Figure 5:
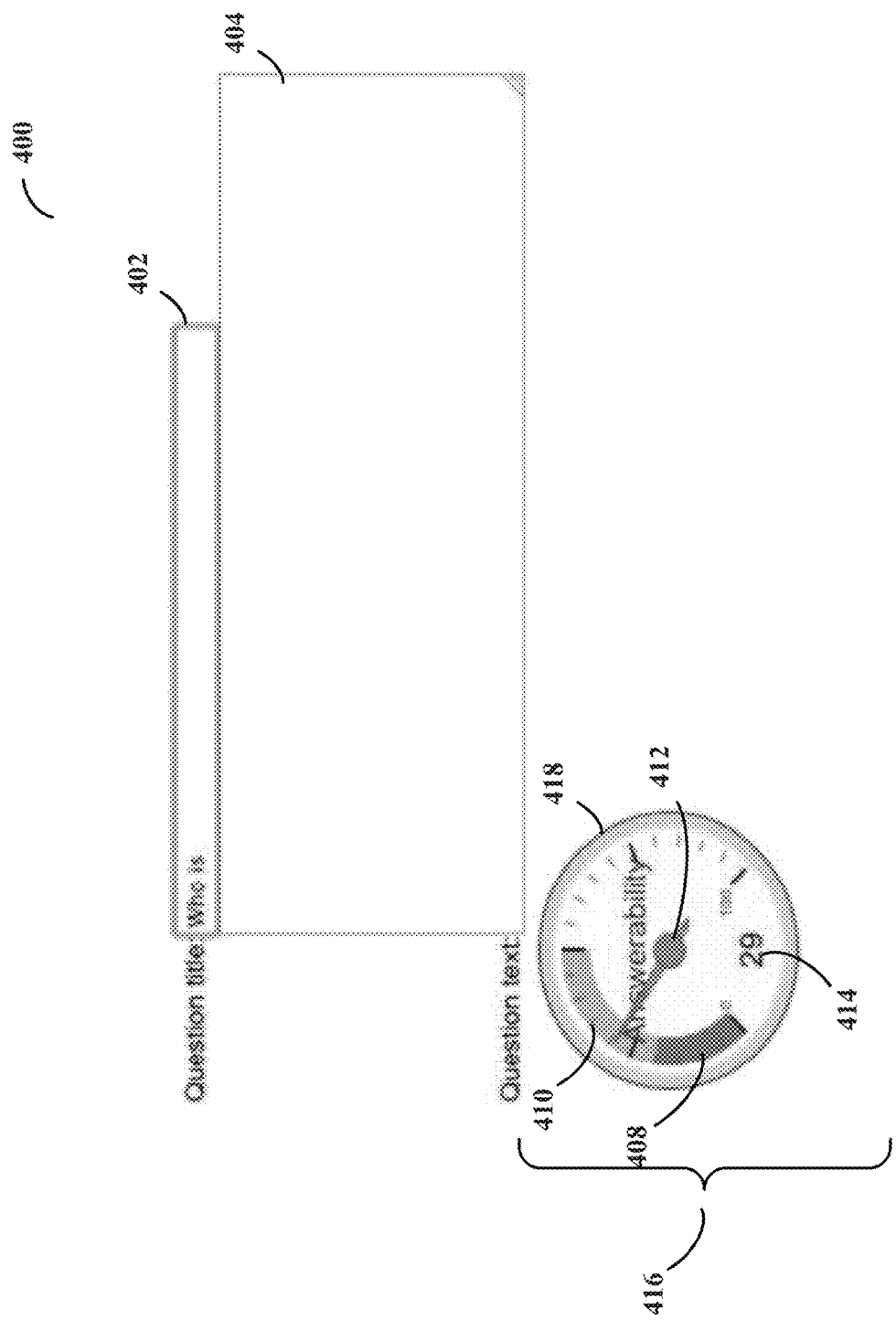
Figure 6:
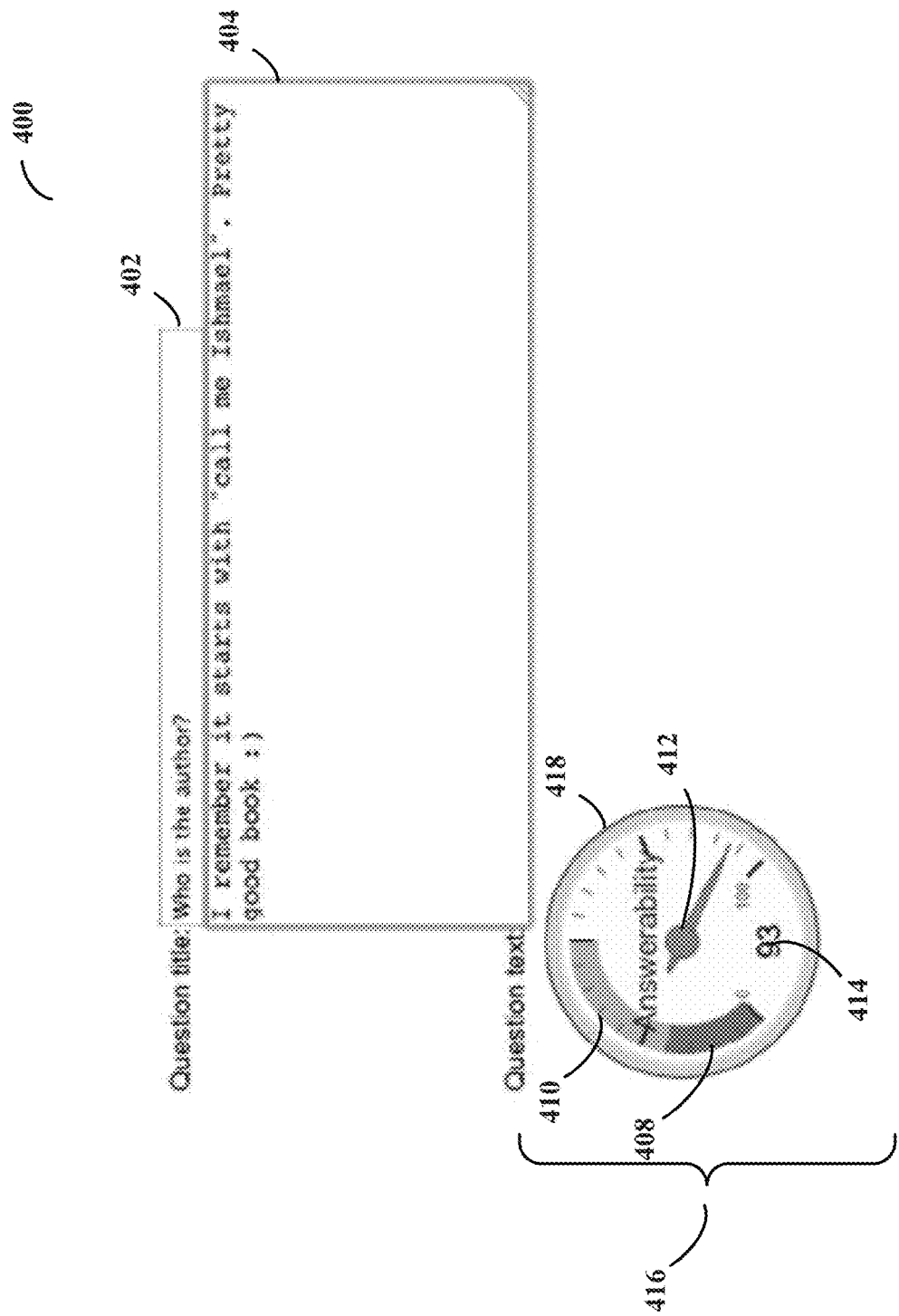

FIGS. 4, 5 and 6 provide examples of a request and response user interface display in accordance with one or more embodiments of the present disclosure. In the example, the request is input in the form of a question in body 404 and a title may be specified for the question in field 402 of user interface display 400. Display 400 further comprises an area, such as area 416, or areas, to display feedback for review by the user, e.g., the user entering a question in question body field 404 and/or a question title in question title field 402.

In the example shown in FIGS. 4, 5 and 6, the feedback, e.g., answerability estimation, comprises an indicator of a metric of the probability, or likelihood, that the user will receive an answer to the question being posed by the user and an indicator of a metric of the estimated number of answers that the user is likely to receive in response to the question. In the example, the probability of an answer, or answers, is presented as a probability meter 418 having a range of probability values from 0 percent probability, an estimate that no one will answer the question, to 100 percent probability, which indicates that the question asked by the user is most likely to receive an answer or answers.

In the example, probability meter 418 is in a form that resembles an analog gauge with incremental markings and a pointer 412 that rotates clockwise or counterclockwise to indicate the value or probability of receiving an answer. The gauge includes ranges 408 and 410, which provide further visual indicators of a probability or answerability of the user's question. Ranges 408 and 410 may be color coded. By way of a non-limiting example, range 408, which may correspond to a probability of less than 25% that the user will receive an answer, may red in color to warn the user that the question as currently posed is not good for purposes of receiving a response, as it has little likelihood of receiving a response. By way of a further non-limiting example, range 410, which may correspond to a probability range from 25% to 50%, might be yellow in color to caution the user that the question has no more than a 50% chance of receiving a response. By way of a further non-limiting example, although not shown, other ranges may be used, such as a range that is colored green, which advises the user that the question is a good question, e.g., a question that has at least a good if not excellent likelihood of receiving an answer. In the example, feedback area 416 includes a number 414, which provides an estimated number of answers that the user is likely to receive in response to the question.

FIG. 4 shows feedback area 416 before the user provides any input in fields 402 and 404. FIG. 5 provides an example of feedback area 416 in response to input provided by the user in title field 402. The feedback is displayed in display 400 as the user types the question and/or question title. At a point shown in FIG. 5, in response to the user input in question title field 402, the probability meter 418 is displaying a probability that is just above 25% answerability, and is displaying indicator 414, which indicates that an estimated number of responses to the user's question is 29.

FIG. 6 provides another example of feedback area 416 in response to a more complete title being provided in title field 402 and a body of the question being provided in field 404. As can be seen, the probability meter 418 indicates that the user is almost certain to receive a response, and indicator 414 indicates that the user is likely to receive a number, 93, of responses. It should be understood that the feedback being displayed in feedback area 416 is subject to change in response to user input. Changes to the question title and or the question body will likely change, either increase or decrease, the answerability score and/or the estimated number of answers.

In the example shown in FIGS. 4, 5 and 6, the user may use answerability feedback provided in area 416 to determine whether or not to submit the question for response to the community of users. By way of a non-limiting example, had the user received the feedback shown in FIG. 5 in response to the question and question title entered in FIG. 6, e.g., an answerability just above 25%, the user might elect to modify the question and/or title before submitting question, or the user might elect to abandon the question in favor of another.

In accordance with one or more embodiments, a category and/or parent category may be assigned to the question based on a determined answerability. A category and/or parent category determined for the user may be provided as part of display 400. The user may be given an opportunity to change the category and/or parent category from the one automatically determined for the user. Additionally and in accordance with one or more embodiments, certain words and/or phrases may be determined to reduce the likelihood that an answer, or answers, might be provided, and/or might reduce the number of estimated answers. In such a case, where such "dampening" words or phrases are used, they may be highlighted so that the user is alerted and has the opportunity to edit the question and/or title to remove any such word or phrase. Such words may vary depending on an identified, e.g., user-identified and/or system-identified category and/or parent category of the question. In accordance with one or more embodiments, typographical and/or grammatical errors may be highlighted so that the user may correct any such error.

In accordance with one or more embodiments, a question may be represented by a feature vector. From a given question, various question attributes are extracted, which question attributes may belong to one of multiple types of information that is associated with any newly asked question, such information types include question meta data, question content and user data. In the following discussion, the term feature family may be used to denote one attribute, e.g., category, parent category, hour, etc., extracted from the data. The attribute may be numerical, categorical or set-valued (e.g. the set of word tokens of the title). Where learning is performed using a gradient-based method, for example, categorical attributes may be converted to binary features, and numeric attributes may be binned.

FIG. 7 provides a table with examples of feature families that may be extracted in accordance with one or more embodiments. The "sparsity" column in the table describes the fraction of nonzero features of each feature-family out of all possible values of that family in all questions; and the "feat.-type" column depicts a manner in which the features are represented, e.g., binary or numeric. For example, the category attribute is transformed into a binary feature vector with 1,287 entries, whereas the title category-words attribute is transformed into a numeric feature vector with 11,286 entries. In the example shown in FIG. 7, a final vector representation of a question may be formed by a concatenation of the feature vectors that correspond to the feature families in the table shown in FIG. 7, resulting in a sparse 48,028-dimensional feature vector.

Content features may be extracted from the questions title and body. By way of a non-limiting example, features extracted from a title associated with a question may be separated from features extracted from a body of the question. A reasoning may be based on the possibility that the title and body may be used for different purposes, e.g., the title may be used to lure answerers to view the whole question while the body provides detailed information. For example, the title is usually very short whereas the body is much longer. Hence, differentiating between title and body features may allow for a better learning of their individual contributions and an improved control over the training procedure.

In accordance with one or more embodiments, title category-tokens are textual tokens, which may include the question's title, e.g. such tokens may comprise tokens {did, I, eat, too, much, today} in connection with the question did I eat too much today?. Tokens may have different meanings, as well as different impacts on expected answers, when occurring in different categories. For example, Jaguar may have a different meaning when used in connection with a Car Makes than when used in connection with a Zoology category. Thus, a question category and or parent category may be used to provide improved word disambiguation, and the question category may be associated with each extracted token, e.g. Car Makes: Jaguar and Zoology: Jaguar.

While dimensionality of all tokens in all categories may amount to a large number of tokens, many of the words that may be used as potential tokens may not be useful. Hence, a feature may be selected by measuring an error reduction of each token, t, in a category c, based on a squared loss:

$$\Delta L(c, t) = L(c) - L(c, t)$$
$$L(c) = \sum_{i \in Q(c)} (\mu_c - y_i)^2$$
$$L(c, t) = \frac{|Q(c, t)|}{|Q(c)|} \sum_{i \in Q(c,t)} (\mu_{c,t} - y_i)^2 + \frac{|Q(c, \neg t)|}{|Q(c)|} \sum_{i \in Q(c, \neg t)} (\mu_{c, \neg t} - y_i)^2$$

In the above example, Q(c) is the set of questions in category c, Q(c, t) is the set of questions in c that contain token t, Q(c, ¬ t) is the set of questions in c that do not contain t, $y_i$ is the number of answers of question i, $$\frac{1}{|Q(c)|} \sum_{i \in Q(c)} y_i$$

is the average over target values in category, c, $\mu_{c,t}$ is the average for all questions containing t in c, and c, $\mu_{c, \neg t}$ is the average for questions not containing t in c. This feature selection heuristic may be geared towards reduction of mean squared error (MSE) by taking into account the size of categories. Thus, between two word-category pairs with similar prediction power, the higher ranking pair refers to a larger category.

By way of one non-limiting example, the <c, t> tokens may be sorted by $\Delta L(c,t)$ and the top 11,286 category-token pairs may be selected. FIG. 8 provides an example of a table showing a list of fifteen top selected <c, t> pairs ordered by respective $\Delta L(c,t)$ values.

Similarly and with respect to body category-tokens, category-tokens may be extracted from a question's body.

In accordance with one or more embodiment, a mean sentiment of the question may be calculated by sentiment analysis tool. The strength of the positive sentiment and the strength of the negative sentiment of the title may be extracted separately. Sentiment strengths may be scaled such that 0 corresponds to neutral and 4 corresponds to an extremely strong sentiment. A sentence can be associated with both positive and negative strength, e.g., I like dogs but I really hate when they start barking might be associated with a positive strength 1 (slightly positive) and a negative strength 4 (strongly negative). In a similar manner, an average of the positive and negative sentiments of all sentences in a question's body may be determined.

A supervised Latent Dirichlet Allocation (LDA) model may be trained on the text of questions, combining titles and bodies. Supervised LDA is capable of finding topics that are strongly indicative of some response variable. In accordance with one or more embodiments, a supervised LDA model may be generated using a small subset of the training set, where the number of answers serves as a target variable.

Some of the topics obtained are shown FIG. 9, together with the learned weight of the supervised regression component of each topic. FIG. 9 provides some non-limiting examples of supervised LDA topics, represented by their ten most prominent word tokens, together with their supervised model weights. Positive (negative) weights are associated with topics likely to get more (less) answers than average. The trained supervised LDA model may be used to estimate the number of answers for each question (either in the training or actual set) and the estimate may be added as a feature.

A Title WH feature family may be used to capture a question type, such as "where" versus "how to" questions, as indicated by the "WH" words that appear in the title of the question: what, when, where, which, who, why, how, is, do and was. The latter three are typically meant to capture yes/no questions. The "Body WH" feature family may be used to extract "WH" words from the question's body. Title length is the length of the title measured by number of tokens after stopword removal. Since the title may be limited, e.g., limited in length to 110 characters, the number of possible values may be constrained.

The length of the body of a question may be measured by number of tokens after stopword removal. This feature may be binned on an exponential scale. Title URL may specify the number of URLs that appear within the question's title. Similar to a title URL feature, a body URL feature may provide a count of the number of URLs in the question's body. By way of a non-limiting example, following a link requires extra labor from the answerer, potentially affecting answering behavior.

The feature set may include asker features, which may comprise a set of features capturing information related to the user posting a question. An asker identity feature may be used to capture the influence of the identity of the asker on the mean number of answers that the asker's questions might receive. A user identity feature may include a number of sub-features, such as fields of interest of the user, a writing style that the user uses, communities with which the user interacts, a nickname and avatar of the user, etc.

A mean number of answers to past questions may also be included; the past mean number of answers an asker received may provide a good indicator for a number of answers a future question posed by the user might receive.

By way of a non-limiting example, a mean, or average, number of answers for questions in a training set may be extracted for each user/asker. For users with significant history, e.g., users that ask a large number of questions, this feature may provide a robust estimate for the expected number of answers for a future question; however, for those users who have asked a very few questions, which may be a large number of users, this feature might not be as effective. To remedy this problem, for each user, the number of training set questions may be counted and the count may be used as an indicator of the robustness of the mean number of answers feature.

More specifically, let $c_u$ be the number of training questions of a user u. User u may be assigned a value that is determined to be $b_u = 1 + \lceil 2 \log_2 c_u \rceil$. Test or validation users with no training question are assigned a bin number $b_u = 0$. The values of $b_u$ may be truncated at 25. This feature family may be associated with a feature vector, e.g., a vector that is 25 in length, and for each asker, the $b_u$ entry of the feature vector stores the training set mean number of answers of the user. For new test or validation users, the value is zero. This allows the learning algorithm to tune a weight of this feature to the number of training questions of the user, e.g., train the value to the confidence in the empirical value of the mean.

A number of training set questions may be a feature family that captures information complimentary to the number of answers feature family, and utilizes information of the total number of questions, in the training set, that were asked by a given user. A value of $b_u$ may be used.

In accordance with one or more embodiments, feature families may use information extracted from non-textual parts of a question unrelated to the user asking the question, such as category, parent category, hour, day of the week, week of the year, etc. A category feature may be used to capture a strong prior of mean number of answers in the category. Each category may be viewed as a community of askers and answerers, where each community has unique characteristics and different dynamics. Categories may differ in volume of activity, number of active users, ratio between regular users and one-time visitors as well as in mean and standard deviation of the number of answers. The distributions of questions among categories and among users may be extremely skewed, with a long tale of sparsely populated categories and users with a single question. Where categories are organized in a taxonomy, or hierarchical structure, the structure may be used to extract a parent category given a question category. The parent category of the assigned category may be extracted as an additional feature family. This feature family may be less sparse than the category feature family and may be helpful for questions that are assigned to rare categories.

An hour feature identifies the hour that the question was posted, and may be used to capture potential daily answering patterns. For example, higher answering rates during the day should affect the average number of answers per question. A day of week feature identifies the day of week the question was posted. Similar to the hour feature, the day of the week feature captures weekly patterns, e.g., increased traffic on weekends. A week of year feature identifies the week the question was posted. The week of the year feature family captures user activity that may be affected by yearly patterns, such as holidays, school vacations, seasons etc.

In accordance with one or more embodiments, a regression model may be used as model 220. Of course it should be apparent that any modeling approach may be used. By way of a non-limiting example, a training set of questions may be denoted as $(X, Y) = \{x_i, y_i\}$, where $x_i$ is a feature vector representation of question $q_i$ and $y_i \in \{0, 1, 2, \ldots\}$ is a number of answers. A prediction target may be denoted by $Z = \log_2(Y+1)$. A single feature family may be denoted by $X^\alpha$, and a concatenation of the features may be denoted by X.

A linear function $b + w^T X = b + \Sigma_\alpha w_\alpha^T X^\alpha$ may be used to model dependency of Z on X. A regularized squared loss may be used to optimize the model parameters b and w. The following provides a non-limiting example:

$$L_\tau(b, w) = \frac{1}{2} \sum_i \left( z_i - \left( b + \sum_\alpha w_\alpha^T x_i^\alpha \right) \right)^2 + \frac{\lambda_1}{2} \sum_\alpha |w_\alpha|^2 + \frac{\lambda_2}{2} \sum_{\langle i,j \rangle \in A} |w_{\beta i} - w_{\beta j}|^2$$

Two regularization terms may be used to reduce the complexity of the model: a standard ridge regression term, and a term that applies to all feature families that represent a numerical attribute but are binned for technical reasons, such as week of the year and body length, for example. A set of the corresponding neighboring feature pairs $\langle i, j \rangle$, e.g. first and second week, or first and $24^{th}$ hour, is represented as A. To learn parameter values, a Stochastic Gradient Descent (SGD) may be used. Random permutations of the observations may be cycled through to achieve convergence. For each learning rate a schedule may be used, e.g., a schedule of the form $$\eta_\alpha^t = \frac{\eta_\alpha^O}{t + \tau},$$

where t, the number of SGD updates and $\tau > 0$ are common to all feature families and $\eta_\alpha^O$ is specific to feature family. There may also be a specific learning rate to learn b. The parameters $\eta$, $\eta_\alpha$, $\lambda_1$, and $\lambda_2$ may be tuned. In accordance with one or more embodiments, $\eta$, $\lambda_1$, and $\lambda_2$ may be set to 0.01, 0 and 0.01, respectively.

Figure 10:
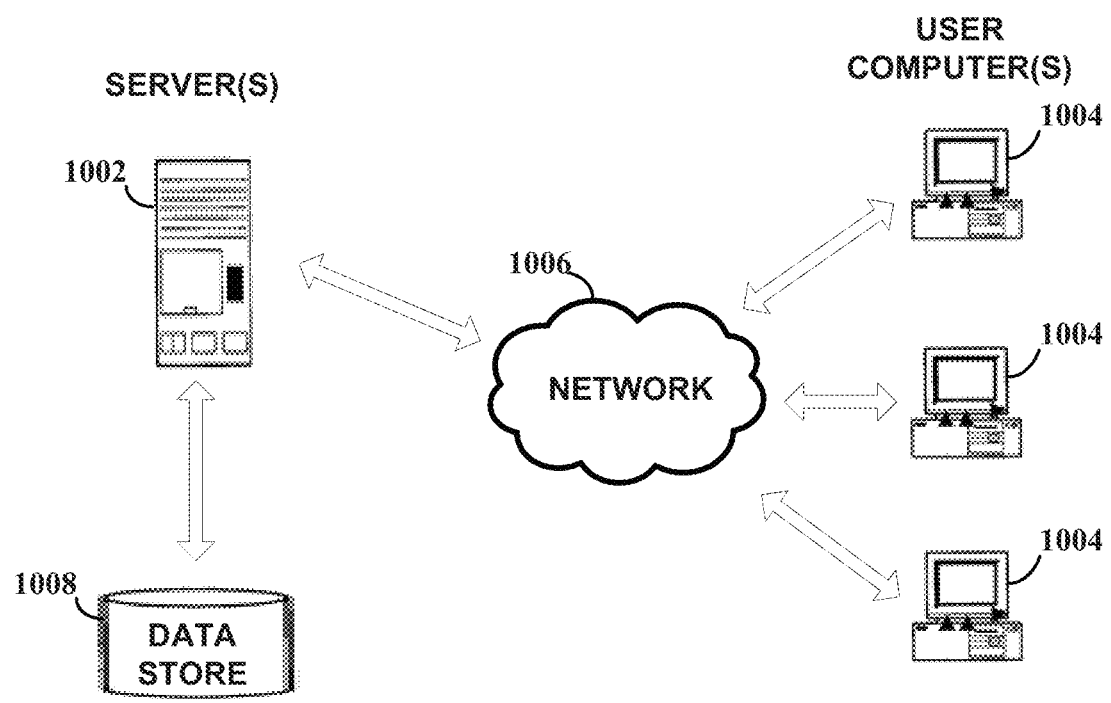
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 1002 and/or 1004 can be configured to execute program code, instructions, etc. to provide functionality in accordance with one or more embodiments of the present disclosure.

Computing device 1002 can serve content to user computing devices 1004 using a browser application via a network 1006. Data store 1008 can be used to store logs 210 and data stored in data store 212, and/or program code, instructions, etc. to configure a server computer 1002 or other computing device to provide functionality in accordance with one or more embodiments of the present disclosure, etc.

The user computing device 1004 can be any computing device, including without limitation a personal computer, personal digital assistant (PDA), wireless device, cell phone, internet appliance, media player, home theater system, and media center, or the like.

For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In accordance with one or more embodiments, a computing device 1002 can make a user interface available to a user computing device 1004 via the network 1006. The user interface made available to the user computing device 1004 can include content items, or identifiers (e.g., URLs) selected for the user interface in accordance with one or more embodiments of the present invention. In accordance with one or more embodiments, computing device 1002 makes a user interface available to a user computing device 1004 by communicating a definition of the user interface to the user computing device 1004 via the network 1006. The user interface definition can be specified using any of a number of languages, including without limitation a markup language such as Hypertext Markup Language, scripts, applets and the like. The user interface definition can be processed by an application executing on the user computing device 1004, such as a browser application, to output the user interface on a display coupled, e.g., a display directly or indirectly connected, to the user computing device 1004. In accordance with one or more embodiments, the user interface may be used to display feedback comprising one or more prediction measures of the likelihood that user members of the community will respond to the request for input. In accordance with one or more such embodiments, the feedback may be based on a prediction, e.g., prediction 226, generated by computing device 1002 or 1004 using model definition 220.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet.

Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 8. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 11:
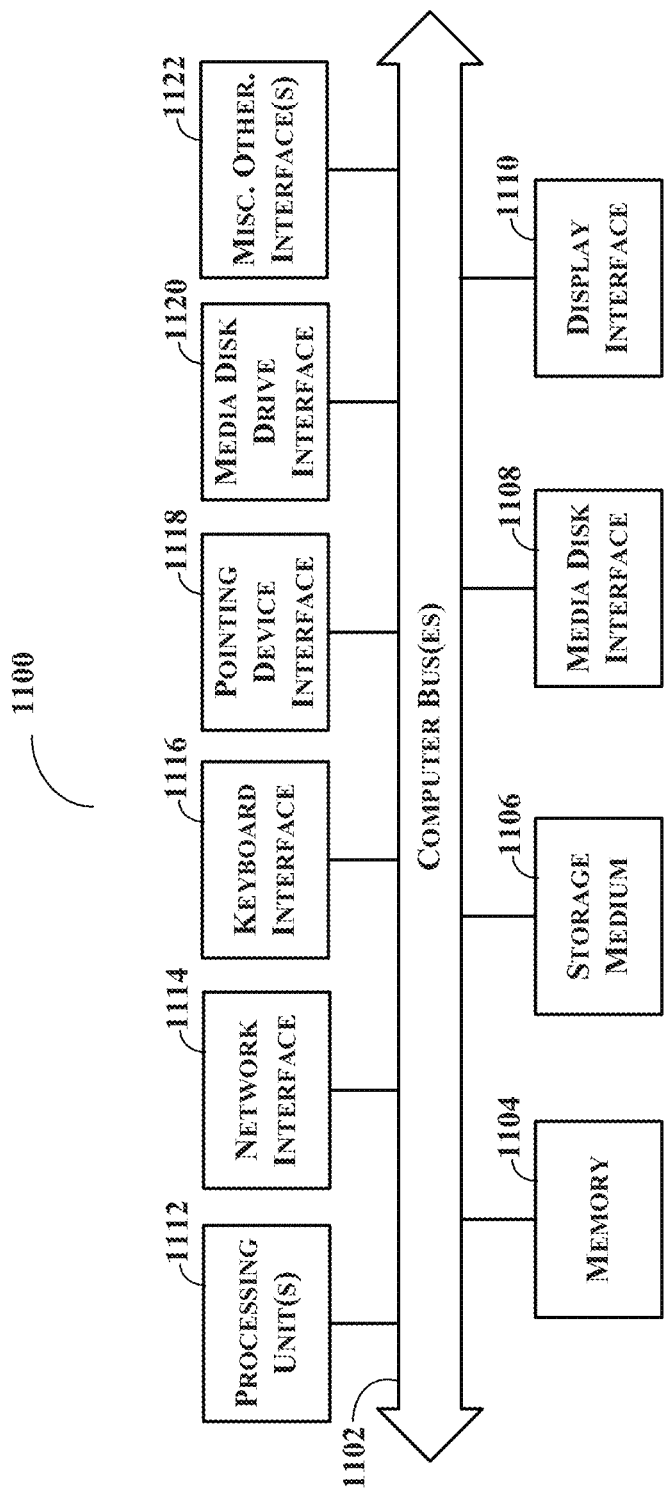
FIG. 11 is a detailed block diagram illustrating an internal architecture of a computing device in accordance with one or more embodiments of the present disclosure.

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
receiving, via a community information sharing system server and a user interface, input from a user member of a community of users of a community-driven application used for online access to the community information sharing system, the input comprising at least a portion of a request, of the user for an answer, to be directed to the community of users;
determining, via the community information sharing system server and using a prediction model, a probability of the user receiving an answer, from the community of users, to the request, probability determination being performed in response to receipt of the input comprising at least a portion of the request for an answer to be directed to the community of users, the prediction model using the input, received from the user and comprising at least a portion of the request for an answer, in determining the probability of the user receiving an answer; and
providing, via the community information sharing system server and for display in the user interface, the determined probability of the user receiving an answer from the community of users to the request of the user for an answer, provision of the determined probability causing the determined probability to be displayed in the user interface as feedback to the user in response to the user's input received prior to receiving posting input to post the request from the user, the feedback further comprising a notification identifying at least a portion of the request determined to have a potential to reduce the probability of response by the community of users.

2. The method of claim 1, wherein the feedback further comprises an estimated number of answers by the community of users.

3. The method of claim 1, wherein the request for a response comprises a question, each response by a member of the user community comprises an answer to the question, and the determined probability is a probability that the community of users will respond with at least one answer to the question.

4. The method of claim 3, wherein the feedback further comprises an estimated number of answers by the community of users.

5. The method of claim 1, the providing the feedback to the user is responsive to at least a portion of the request entered by the user, and the feedback is provided prior to the user submitting the request for access by the community of users.

6. The method of claim 1, the prediction model is generated using training data comprising information collected about past questions and corresponding answers and users providing the past questions and the corresponding answers.

7. The method of claim 1, the notification comprising highlighting the at least a portion of the request determined to have a potential to reduce the probability of response by the community of users.

8. The method of claim 1, the probability determination is made prior to receiving posting input to post the request from the user.

9. A community information sharing system server comprising:
a processor and a non-transitory computer-readable storage medium for tangibly storing thereon program logic for execution by the processor, the stored program logic comprising:
receiving logic executed by the processor for receiving input from a user member of a community of users of a community-driven application used for online access to the community information sharing system, the input comprising at least a portion of a request, of the user for an answer, to be directed to the community of users;
determining logic executed by the processor for determining, using a prediction model, a probability of the user receiving an answer, from the community of users, to the request, probability determination being performed in response to receipt of the input comprising at least a portion of the request for an answer to be directed to the community of users, the prediction model using the input, received from the user and comprising at least a portion of the request for an answer, in determining the probability of the user receiving an answer; and
providing logic executed by the one or more processors for providing, for display in the user interface, the determined probability of the user receiving an answer from the community of users to the request of the user for an answer, provision of the determined probability causing the determined probability to be displayed in the user interface as feedback to the user in response to the user's input received prior to receiving posting input to post the request from the user, the feedback further comprising a notification identifying at least a portion of the request determined to have a potential to reduce the probability of response by the community of users.

10. The server of claim 9, wherein the feedback further comprises an estimated number of responses by the community of users.

11. The server of claim 9, wherein the request for a response comprises a question, each response by a member of the user community comprises an answer to the question, and the determined probability is a probability that the community of users will respond with at least one answer to the question.

12. The server of claim 11, wherein the feedback further comprises an estimated number of answers by the community of users.

13. The server of claim 9, the providing the feedback to the user is responsive to at least a portion of the request entered by the user, and the feedback is provided prior to the user submitting the request for access by the community of users.

14. The server of claim 9, the prediction model is generated using training data comprising information collected about past questions and corresponding answers and users providing the past questions and the corresponding answers.

15. The server of claim 9, the notification comprising highlighting the at least a portion of the request determined to have a potential to reduce the probability of response by the community of users.

16. A computer readable non-transitory storage medium for tangibly storing thereon computer readable instructions, that when executed by a community information sharing system server, perform a function comprising:

receiving input from a user member of a community of users of a community-driven application used for online access to the community information sharing system, the input comprising at least a portion of a request, of the user for an answer, to be directed to the community of users;

determining, using a prediction model, a probability of the user receiving an answer, from the community of users to the request, probability determination being performed in response to receipt of the input comprising at least a portion of the request for an answer to be directed to the community of users, the prediction model using the input, received from the user and comprising at least a portion of the request for an answer, in determining the probability of the user receiving an answer; and providing, for display in the user interface, the determined probability of the user receiving an answer from the community of users to the request of the user for an answer, provision of the determined probability causing the determined probability to be displayed in the user interface as feedback to the user in response to the user's input received prior to receiving posting input to post the request from the user, the feedback further comprising a notification identifying at least a portion of the request determined to have a potential to reduce the probability of response by the community of users.

17. The medium of claim 16, wherein the feedback further comprises an estimated number of answers by the community of users.

18. The medium of claim 16, wherein the request for a response comprises a question, each response by a member of the user community comprises an answer to the question, and the determined probability is a probability that the community of users will respond with at least one answer to the question.

19. The medium of claim 18, wherein the feedback further comprises an estimated number of answers by the community of users.

20. The medium of claim 16, the providing the feedback to the user is responsive to at least a portion of the request entered by the user, and the feedback is provided prior to the user submitting the request for access by the community of users.

21. The medium of claim 16, the prediction model is generated using training data comprising information collected about past questions and corresponding answers and users providing the past questions and the corresponding answers.

22. The medium of claim 16, the notification comprising highlighting the at least a portion of the request determined to have a potential to reduce the probability of response by the community of users.

* * * * *